(12) United States Patent
Iisaka (10) Patent No.: US 11,230,781 B1
(45) Date of Patent: Jan. 25, 2022

(54) METHOD FOR FORMING SILVER FILM (71) Applicant: TOYOTA JIDOSHA KABUSHIKI KAISHA, Toyota (JP)

(72) Inventor: Hirofumi Iisaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/337,521

(22) Filed: Jun. 3, 2021

(30) Foreign Application Priority Data

Jul. 29, 2020 (JP) .............................. JP2020-128028

(51) Int. Cl.
*C25D 3/46* (2006.01)
*C25D 17/00* (2006.01)

(52) U.S. Cl.
CPC .............. *C25D 3/46* (2013.01); *C25D 17/002* (2013.01)

(58) Field of Classification Search
None
See application file for complete search history.

(56) References Cited

U.S. PATENT DOCUMENTS

2015/0329982 A1* 11/2015 Miura ................... C25D 7/0607
 205/98
2016/0265126 A1* 9/2016 Hiraoka ................... C25D 5/08

FOREIGN PATENT DOCUMENTS

JP   H05148681 A    6/1993
JP   2006307321 A   11/2006
JP   2016169399 A   9/2016

OTHER PUBLICATIONS

Tetsuya Kondo et.al., Journal of The Surface Finishing Society of Japan, 42-2, 1991, p. 241-245.

* cited by examiner

*Primary Examiner* — Wojciech Haske
(74) *Attorney, Agent, or Firm* — Dickinson Wright, PLLC (57) ABSTRACT

It is an object of the present disclosure to provide a method that allows uniformly forming a silver film by a solid electrolyte deposition. One aspect of this embodiment is a method for forming a silver film. The method includes disposing an anode, a substrate as a cathode, and a separator such that the separator is positioned between the anode and the substrate and the separator is in contact with a surface of the substrate, the separator including an electrolytic solution that contains silver ions, and applying a voltage between the anode and the substrate to form a silver film on the substrate. The separator is a porous membrane without ion exchange functional group. The electrolytic solution contains organic sulfonic acid ions. The substrate contains a crystalline metal, and a silver film is formed on the crystalline metal.

10 Claims, 2 Drawing Sheets

METHOD FOR FORMING SILVER FILM

CROSS REFERENCE TO RELATED APPLICATIONS

The present application claims priority from Japanese patent application JP 2020-128028 filed on Jul. 29, 2020, the entire content of which is hereby incorporated by reference into this application.

BACKGROUND

Technical Field

The present disclosure relates to a method for forming a silver film.

Background Art

A metal film is formed on a surface of a substrate to form, for example, a metal circuit pattern of an electronic circuit board and the like. As a film formation technique of the metal film, for example, as disclosed in JP H05-148681 A, there has been known a film forming method using a solid electrolyte deposition (SED method). The solid electrolyte deposition is a technique in which a separator (solid), such as a solid electrolyte membrane, is brought into contact with a substrate (solid) to form a film, thus having an advantage that a waste liquid is small in amount and an environmental load can be reduced.

Specifically, JP H05-148681 A discloses a metal film formation device that includes an anode, a cathode, a solid electrolyte disposed between the anode and the cathode, and a power supply unit that applies a voltage between the anode and the cathode. In the device disclosed in JP H05-148681 A, the anode is formed of a metallic material constituting a metal film, and the anode is partially ionized by applying the voltage to the anode and the cathode. In the device disclosed in JP H05-148681 A, the metal ions generated by the ionization of the anode pass through the solid electrolyte to be deposited on a substrate disposed in the cathode side, thus forming the metal film on the substrate surface.

JP 2016-169399 A discloses a metal film formation device that includes at least an anode, a solid electrolyte membrane disposed between the anode and a substrate that serves as a cathode, and a power supply unit that applies a voltage between the anode and the substrate. In the metal film formation device, the voltage is applied between the anode and the substrate in a state where the solid electrolyte membrane is brought into contact with the substrate from the upper side, thereby reducing metal ions contained in the solid electrolyte membrane to form a metal film on a surface of the substrate. The film formation device includes a liquid housing portion between the anode and the solid electrolyte membrane. The liquid housing portion houses an electrolytic solution containing the metal ions such that the electrolytic solution contacts the anode and the solid electrolyte membrane. The film formation device includes a vibrator that vibrates at least the anode in a state where the solid electrolyte membrane is brought into contact with the substrate.

Meanwhile, because of the high electrical conductivity, as well as excellent corrosion resistance and solderability, a silver plating film is industrially widely used as plating to an electrical contact. When an inverter becomes hotter, a silver sintered joint layer by a silver paste is used instead of a solder joint layer having a low melting point. When the silver sintered joint layer is used, a silver plated layer is used as a buffer layer. While a cyan bath is generally used as a silver plating bath for the silver plated layer, there is a drawback in working conditions and a wastewater treatment because of a high toxicity. Therefore, a non-cyanide bath without cyan has been examined, and for example, silver chloride-potassium iodide 1), silver chloride-sodium thiosulfate base 2), silver nitrate-tartaric acid base 3), silver chloride-potassium ferrocyanide base 4), and thiocyanic acid based bath 5) have been reported. Silver Plating from Silver Methane Sulfonate-Potassium Iodide Baths (Tetsuya Kondo, et. al, Journal of The Surface Finishing Society of Japan, 42-2, 1991, page 241-245) discloses a silver methanesulfonate-potassium iodide bath.

SUMMARY

As described above, since the solid electrolyte deposition is a technique in which a separator (solid), such as a solid electrolyte membrane, is brought into contact with a substrate (solid) to form a film, there is an advantage that the waste liquid is reduced and the environmental load can be lowered.

However, it has been found that, in an attempt to form a silver film by the conventional solid electrolyte deposition, a non-film formation portion is generated on the substrate of a formation target, thus failing to obtain a uniform film in some cases. Specifically, for example, it has been found that, by the solid electrolyte deposition using the solid electrolyte membrane, a silver dendrite is generated in the solid electrolyte membrane, thus failing to uniformly form a silver film in some cases. In addition, it has been found that because of other various factors, the silver film cannot be uniformly formed by the conventional solid electrolyte deposition in some cases.

Therefore, the present disclosure provides a method that allows uniformly forming a silver film by a solid electrolyte deposition.

The following describes one aspect of the embodiment.

(1) A method for forming a silver film that comprises: disposing an anode, a substrate as a cathode, and a separator such that the separator is positioned between the anode and the substrate and the separator is in contact with a surface of the substrate, the separator including an electrolytic solution that contains silver ions; and applying a voltage between the anode and the substrate to form a silver film on the substrate. The separator is a porous membrane without ion exchange functional group. The electrolytic solution contains organic sulfonic acid ions. The substrate contains a crystalline metal, and the silver film is formed on the crystalline metal.

(2) In the method according to (1), the electrolytic solution contains silver organic sulfonate.

(3) In the method according to (2), the silver organic sulfonate is silver alkanesulfonate.

(4) In the method according to (3), the silver alkanesulfonate is silver methanesulfonate.

(5) In the method according to any one of (1) to (4), the electrolytic solution is a silver methanesulfonate-potassium iodide bath.

(6) In the method according to (5), the electrolytic solution further contains N-(3-hydroxy-1-butylidene)-p-sulfanilic acid (HBPSA).

(7) In the method according to any one of (1) to (6), the porous membrane is a polyolefin resin porous membrane.

(8) In the method according to (7), the polyolefin resin porous membrane is a polyethylene resin porous membrane.

(9) In the method according to any one of (1) to (8), the crystalline metal is a nickel film.

(10) In the method according to (9), the nickel film has a columnar crystal form.

This disclosure can provide a method that allows uniformly forming a silver film by a solid electrolyte deposition is provided.

DETAILED DESCRIPTION

This embodiment is a method for forming a silver film. The method includes: disposing an anode, a substrate as a cathode, and a separator such that the separator is positioned between the anode and the substrate and the separator is in contact with a surface of the substrate, the separator including an electrolytic solution that contains silver ions; and applying a voltage between the anode and the substrate to form a silver film on the substrate. The separator is a porous membrane without ion exchange functional group. The electrolytic solution contains organic sulfonic acid ions. The substrate contains a crystalline metal, and the silver film is formed on the crystalline metal.

This embodiment can provide a method that allows uniformly forming the silver film by a solid electrolyte deposition.

In this embodiment, as the separator in the solid electrolyte deposition, a porous membrane having no ion exchange functional group is used. Using the porous membrane without ion exchange functional group as the separator reduces capturing silver ions in the separator, thereby allowing suppression of silver dendrite generation in the separator. Meanwhile, when a solid electrolyte membrane is used in the solid electrolyte deposition, it is difficult to form a uniform silver film. This is considered to be caused by the following reason. In the solid electrolyte membrane, a channel referred to as an ion channel having a diameter of a few nm is disposed. In a wall surface (surface) of the solid electrolyte membrane defining the ion channel, ion exchange functional groups comprising sulfonic acid groups are present. When a voltage is applied between the anode and the cathode, metal ions move from the anode toward the cathode in the ion channel. However, when the metal ions are silver ions, the silver ions easily cause ion migration due to water adhesion to the solid electrolyte membrane and the voltage application. Therefore, it is considered that the silver dendrite is easily generated in the solid electrolyte membrane.

In this embodiment, for the electrolytic solution, an electrolytic solution containing organic sulfonic acid ions is used. The organic sulfonic acid ions are present close to the silver ions in the electrolytic solution. In a formation reaction of the silver film, a decomposition reaction of water in the electrolytic solution occurs in addition to the silver ion reduction, thus generating a hydrogen gas. When the electrolytic solution contains the organic sulfonic acid ions, since the organic sulfonic acid ions are present close to the silver ions, the decomposition reaction of water in the electrolytic solution can be suppressed, and consequently, the hydrogen gas generation can be suppressed.

Furthermore, in this embodiment, the silver film is formed on a crystalline metal. The surface of the crystalline metal has a fine unevenness. As described above, in the silver film formation reaction, the decomposition reaction of water in the electrolytic solution occurs in addition to the silver ion reduction, thus generating the hydrogen gas. While the generated hydrogen gas can be diffused in the electrolytic solution by stirring and the like in a plating method using an electrolyzer, the hydrogen gas easily remains between the separator and the substrate surface, and the remaining hydrogen gas hinders the reaction, thus possibly generating a non-film formation portion in the case of the solid electrolyte deposition. However, in this embodiment, the film formation on the crystalline metal causes the generated hydrogen gas to easily diffuse due to the fine unevenness on the surface of the crystalline metal, and consequently, the hydrogen gas is easily emitted from between the separator and the substrate surface.

Because of the reasons described above, it is considered that the forming method according to this embodiment allows uniformly forming the silver film.

The following describes the method for forming the silver film according to this embodiment in detail with reference to the drawings.

Figure 1A:
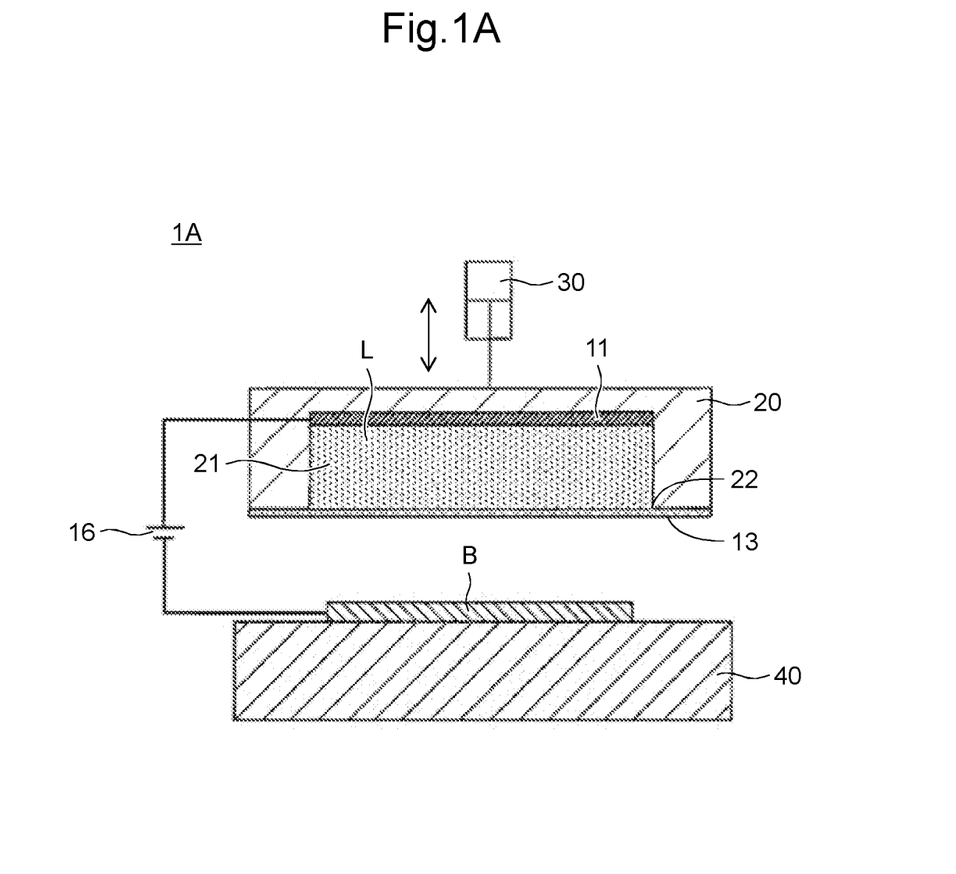
FIG. 1A is a schematic cross-sectional view illustrating an exemplary configuration of a film formation device usable for a forming method according to the embodiment.
Figure 1B:
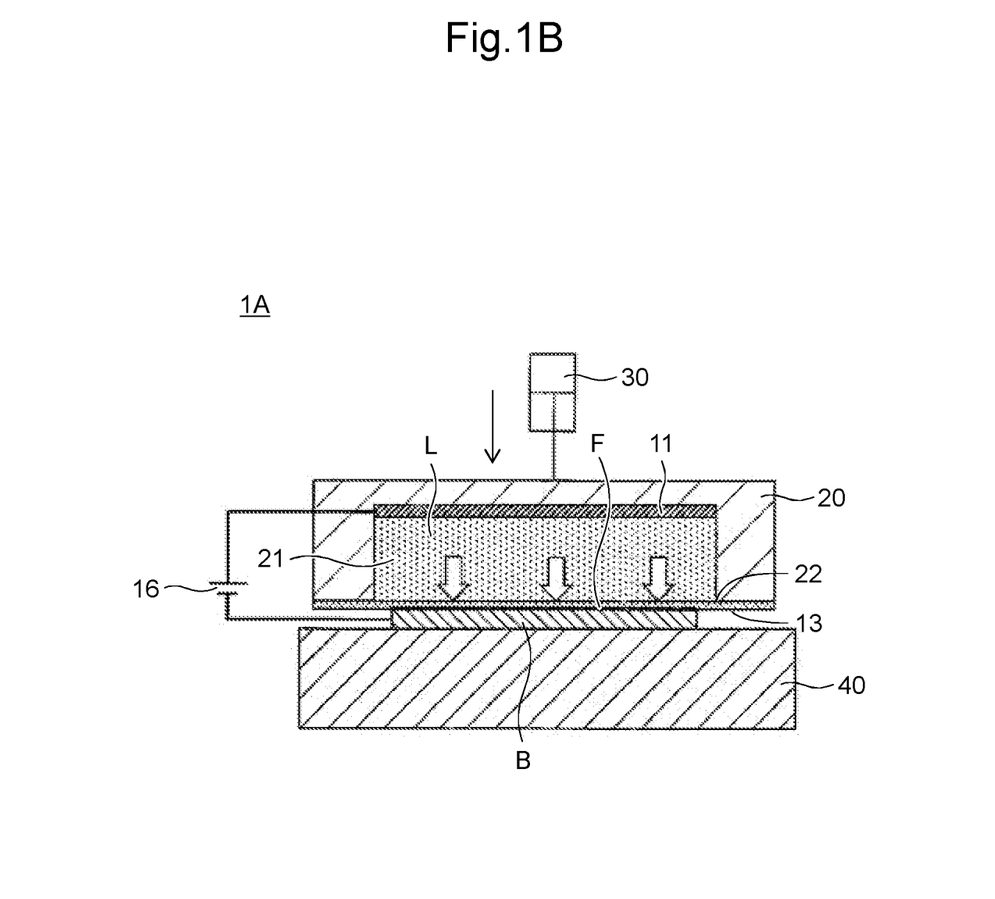
FIG. 1B is a schematic cross-sectional view illustrating a process for forming a silver film on a substrate using the film formation device of FIG. 1A.

FIG. 1A and FIG. 1B illustrate an exemplary film formation device to which the forming method according to this embodiment is applied.

FIG. 1A is a schematic cross-sectional view of a film formation device 1A. The film formation device 1A includes an anode 11, a substrate B as a cathode, a porous membrane 13, and a power supply unit 16. The porous membrane 13 is disposed between the anode 11 and the substrate B, serves as a separator, and does not have ion exchange functional groups. The power supply unit 16 applies a voltage between the anode 11 and the substrate B.

The film formation device 1A further includes a housing 20. The housing 20 includes a chamber 21 that houses a silver-containing solution L such that the silver-containing solution L is disposed between the anode 11 and the porous membrane 13. The silver-containing solution L housed in the chamber 21 is in contact with the porous membrane 13 and the anode 11.

The chamber 21 is provided with an opening 22 greater than a surface size of the substrate B. The opening 22 is covered with the porous membrane 13, and the silver-containing solution L is flowably sealed in the chamber 21. The film formation device 1A further includes a placement table 40 on which the substrate B is to be placed. The film formation device 1A further includes a pressing portion 30 at the upper portion of the housing 20.

FIG. 1B is a drawing for describing a process for forming a silver film F on the surface of the substrate B using the film formation device 1A of FIG. 1A.

As illustrated in FIG. 1B, in a state where the substrate B is placed on the placement table 40, the placement table 40 and the housing 20 are relatively moved to sandwich the substrate B between the porous membrane 13 and the placement table 40, thus disposing the silver-containing solution L on the surface of the substrate B via the porous membrane 13.

Next, the power supply unit 16 applies the voltage between the anode 11 and the substrate B, and silver ions contained in the porous membrane 13 are reduced in the surface of the substrate B to deposit silver on the surface, thus forming the silver film F.

In this embodiment, a porous membrane without ion exchange functional group is used as the separator. Using the porous membrane without ion exchange functional group as the separator reduces capturing silver ions in the separator, thereby allowing suppression of silver dendrite generation in the separator.

While the porous membrane without ion exchange functional group is not specifically limited, for example, a polyolefin resin porous membrane comprising a polyolefin resin can be used. The polyolefin resin includes, for example, polyethylene, polypropylene, polybutylene, or a mixture of them. The polyolefin resin porous membrane is a polyethylene resin porous membrane comprising a polyethylene resin in some embodiments. The porous membrane has a mesh structure having a three-dimensionally and irregularly connected network structure in some embodiments. The porous membrane may have a single layer structure, or may have a multilayer structure. One polyolefin resin may be used alone, or two or more polyolefin resins may be used in combination.

The polyolefin resin comprises polyethylene in some embodiments, and polyethylene includes ultra-high molecular weight polyethylene, high-density polyethylene having a density of 0.942 or more, medium-density polyethylene having a density of 0.925 or more and less than 0.942, low-density polyethylene having a density of less than 0.925, and the like. The polyethylene may be not only an ethylene homopolymer but also a copolymer comprising a small amount of another α-olefin. As the α-olefin other than ethylene, propylene, 1-butene, 1-pentene, 1-hexene, 4-methyl-1-pentene, 1-octene, (meth)acrylic acid, (meth)acrylic acid ester, styrene, or the like can be used.

The polyethylene may comprise one polyethylene, or may comprise two or more polyethylene. As a polyethylene mixture, a mixture of two or more ultra-high molecular weight polyethylene different in Mw, a mixture of two or more high-density polyethylene different in Mw, a mixture of two or more medium-density polyethylene different in Mw, or a mixture of two or more low-density polyethylene different in Mw may be used, or a mixture of two or more polyethylene selected from the group consisting of ultra-high molecular weight polyethylene, high-density polyethylene, medium-density polyethylene, and low-density polyethylene may be used.

While not specifically limited, the method for producing a porous membrane using a polyolefin resin as a raw material can be exemplified as follows. For example, a resin is melted with a plasticizer, such as a liquid paraffin, extruded from a T-die to be formed in a sheet shape, the obtained sheet is extended, and subsequently, the plasticizer contained in the sheet is extracted.

The method for producing the porous membrane mainly includes a dry method (stretching pore-forming process) and a wet method (phase separation method). The dry method is a method in which a membrane that is formed of a polymer and has a uniform composition is annealed to form a lamellar structure, and subsequently, this membrane is uniaxially extended to cleave an interfacial interface in the lamellar structure, thus forming holes. In the porous membrane formed by the dry method, the holes linearly penetrate in a thickness direction of the porous membrane. Meanwhile, the wet method is a method in which a membrane of microphase-separated polymer and solvent is produced, and a solvent phase is extracted and removed from this membrane, thus forming holes. The membrane may be extended before the extraction and removal of the solvent, or may be extended after the extraction and removal of the solvent. The wet method allows producing the porous membrane with various hole structures by selecting the combination of the polymer and the solvent, the extending condition, and the like. Since the holes formed by the wet method forms a three-dimensionally irregular and uniform mesh structure, the porous membrane obtained by the wet method has a high mechanical strength. As the porous membrane used in this embodiment, a porous membrane (wet separator) produced by the wet method is used in some embodiments. Since the wet separator has a relatively large number of unevennesses on the surface, the hydrogen gas is easily emitted outside.

The functional group is an atom or an atom group that is a cause of a distinctive reactivity of an organic compound, and also referred to as a functional atomic group or a functioning group. The ion exchange functional group includes both of a cation exchange functional group and an anion exchange functional group. The cation exchange functional group includes a sulfonic acid group, a sulfonimide group, a sulfone methide group, a phosphonic acid group, a carboxylic acid group, or the like. The anion exchange functional group includes a quaternary ammonium group, a quaternary pyridinium group, primary to tertiary amino group, a pyridyl group, an imidazolyl group, or the like. Note that, a group (group without ion-exchange property) other than the ion exchange functional group includes an alkyl group, an olefin group, an acetylene group, an aromatic group, or the like. "Without ion exchange functional group" means that the ion exchange functional groups are not contained at all (that is, only the groups other than the ion exchange functional groups are contained), or that the ion exchange functional groups are substantially not contained. "The ion exchange functional groups are substantially not contained" means that even when the ion exchange functional groups are contained, the amount is an amount that does not substantially provide the ion exchangeable function to the porous membrane. Specifically, when a ratio of the atomic number between oxygen and carbon in the porous membrane obtained with an X-ray photoelectron spectroscopy is 0.1 or less, or 0.02 or less in some embodiments, it is included in the case where the porous membrane does not contain the ion exchange functional groups.

The presence or absence of the ion exchange functional group can be examined by various kinds of qualitative analysis method and quantitative analysis method. As the qualitative analysis method, an appropriate method can be selected depending on the functional group. For example, the presence or absence of the sulfonic acid group can be examined by an alkali fusion test or an iron-hydroxamic acid (ferric hydroxamate) test. The presence or absence of the carboxylic acid group can be examined by the ferric hydroxamate test, a pH test, or the like. The quantitative analysis method includes an ultraviolet spectroscopy, an infrared spectroscopy, a Raman spectroscopy, a nuclear magnetic resonance spectroscopy, a mass spectrometry, an X-ray photoelectron spectroscopy using chemical modification, an X-ray analysis, or the like.

An arithmetic mean roughness (Ra) of the porous membrane is 28 to 60 nm in some embodiments, and 32 to 50 nm in some embodiments. In this description, the arithmetic mean roughness (Ra) is the arithmetic mean roughness defined in Japanese Industrial Standard R 1683 (2007). The arithmetic mean roughness (Ra) in the surface of the separator can be measured using an atomic force microscope (Nano Scope II, manufactured by Digital Instruments).

A pore diameter of the porous membrane is, for example, 20 to 1000 nm, and is 25 to 500 nm in some embodiments. The pore diameter in the above-described range allows improving a current efficiency. Here, the pore diameter means a volume average of a pore diameter distribution. The pore diameter distribution can be obtained with a method of mercury penetration according to Japanese Industrial Standard R 1655: 2003. The method of mercury penetration is a method in which a pressure is applied to cause mercury to enter open pores, a relationship between a volume of the mercury entered the open pores and a pressure value applied at this time is obtained, and a diameter of the open pore is calculated from Washburn's formula based on its result assuming that the open pore has a columnar shape.

A porosity of the porous membrane is 20 to 80% in some embodiments. The porous membrane porosity of 20% or more allows achievement of a satisfactory permeability of the electrolytic solution. The porous membrane porosity of 80% or less allows providing a sufficient mechanical strength of the membrane. The porosity is 25 to 65% in some embodiments, and 30 to 55% in some embodiments. The porosity is a proportion (volume %) of a pore part in the porous membrane, and can be calculated from a result obtained by measuring sample volume ($cm^3$) and mass (g) using the following formula.

porosity (%)=(1−mass/(resin density×sample volume))×100

An air permeability of the porous membrane is, for example, 5 to 500 s/100 $cm^3$, and 10 to 260 s/100 $cm^3$ in some embodiments. When the air permeability is in the above-described range, the current efficiency can be improved. The air permeability is measured according to Japanese Industrial Standard L 1096-6-27-1A or ASTM-D737.

A thickness of the porous membrane is, for example, 5 to 175 μm, and 12 to 150 μm in some embodiments. When the thickness is in the above-described range, the current efficiency can be improved.

As the porous membrane, a commercially available battery separator can be used. The commercially available separator is low cost compared with a conventional solid electrolyte membrane having ion exchange functional groups, and additionally, further cost reduction is expected.

In this embodiment, the electrolytic solution contains at least one silver ion source, and contains organic sulfonic acid ions. The electrolytic solution containing organic sulfonic acid ions allows suppressing the decomposition reaction of water in the electrolytic solution, and consequently, the hydrogen gas generation can be suppressed.

As the silver ion source, silver organic sulfonate is used in some embodiments. The use of silver organic sulfonate allows presence of silver ions and organic sulfonic acid ions used in this embodiment in the electrolytic solution. The silver organic sulfonate includes silver alkanesulfonate, silver arylsulfonate, or the like. The silver alkanesulfonate includes, for example, (C1-C6) silver alkanesulfonate. The silver alkanesulfonate is (C1-C3) silver alkanesulfonate in some embodiments. The silver alkanesulfonate includes silver methanesulfonate, silver ethanesulfonate, silver propanesulfonate, or the like. The silver arylsulfonate includes silver benzenesulfonate, silver p-toluenesulfonate, or the like. One silver ion source may be used alone, or two or more silver ion sources may be used in combination. The electrolytic solution does not contain cyanide in some embodiments. The silver ion source content in the electrolytic solution is, for example, 50 to 500 g/L, 100 to 450 g/L in some embodiments, and 150 to 400 g/L in some embodiments.

As the organic sulfonic acid ion source, organic sulfonic acid can be used as well. The organic sulfonic acid includes alkane sulfonic acid, aryl sulfonic acid, or the like. The alkane sulfonic acid includes methanesulfonic acid, ethanesulfonic acid, propanesulfonic acid, butanesulfonic acid, methylbutane sulfonic acid, hexanesulfonic acid, or the like. The aryl sulfonic acid includes toluenesulfonic acid, phenylsulfonic acid, phenolsulfonic acid, or the like. One organic sulfonic acid ion source may be used alone, or two or more organic sulfonic acid ion sources may be used in combination.

The electrolytic solution may contain various electrolytes typified by acids and bases in addition to the silver ion source and/or the organic sulfonic acid ion source. While not specifically limited, the electrolyte includes hydrochloric acid, sulfuric acid, hydrofluoric acid, nitric acid, succinimide, boric acid, sulfamic acid, or the like. Salts of acids and bases can be used as the electrolyte as well. Alkali metal chloride salt or alkali metal nitrate salt, for example, a conductive salt, such as potassium chloride or potassium nitrate, may be contained. One electrolyte may be used alone, or two or more electrolytes may be used in combination. For example, the electrolyte can contain a mixture of acids, a mixture of bases, or a mixture of one or more acids and one or more bases. The electrolyte content in the electrolytic solution is, for example, 1 to 100 g/L.

The electrolytic solution may contain a buffer. While not specifically limited, the buffer includes a borate buffer, a phosphate buffer, a citrate buffer, a carbonate buffer, a sulfamate buffer, or the like.

A pH of the electrolytic solution is for example, 3.0 to 10.0, and 4.5 to 7.0 in some embodiments.

The electrolytic solution may contain an additive in some cases. While the additive is not limited, the additive includes a corrosion inhibitor, a stabilizer, or the like.

In this embodiment, the electrolytic solution is a silver methanesulfonate-potassium iodide bath in some embodiments. The silver methanesulfonate-potassium iodide bath is a water solution at least containing silver methanesulfonate and potassium iodide. For example, the silver methanesulfonate is contained as a silver ion source, and the potassium iodide is contained as a complexing agent. The silver methanesulfonate-potassium iodide bath may contain various electrolytes typified by acids and bases, the buffer, and the like in addition to the silver methanesulfonate and the potassium iodide. The acid to be added includes methanesulfonic acid in some embodiments. When the silver methanesulfonate-potassium iodide bath is used as the electrolytic solution, at least two ligands to silver ions, methanesulfonic acid ions and iodine ions, are present. The presence of the methanesulfonic acid ions and the iodine ions as the ligands causes the ligands to easily dissociate from the silver ions, thus causing the silver ions to be easily deposited on the substrate. In other words, having the two ligands of the methanesulfonic acid ions and the iodine ions causes an interaction between the ligands, thus making the silver ions easily dissociate.

The electrolytic solution is a silver methanesulfonate-potassium iodide bath in which N-(3-hydroxy-1-butylidene)-p-sulfanilic acid (HBPSA) is added in some embodiments. By the use of the silver methanesulfonate-potassium iodide bath in which HBPSA is added as the electrolytic solution, a fine silver film can be produced.

A content of the silver methanesulfonate in the silver methanesulfonate-potassium iodide bath is, for example, 50 to 500 g/L, 100 to 450 g/L in some embodiments, 130 to 400 g/L in some embodiments, 150 to 350 g/L in some embodiments, and 160 to 300 g/L in some embodiments. A content of the potassium iodide in the silver methanesulfonate-potassium iodide bath is, for example, 200 to 800 g/L, and 300 to 700 g/L in some embodiments, and 400 to 600 g/L in some embodiments. A content of the HBPSA in the silver methanesulfonate-potassium iodide bath is, for example, 5 to 60 g/L, and 10 to 50 g/L in some embodiments, and 20 to 40 g/L in some embodiments.

In this embodiment, the substrate can be substrate used as the cathode, and comprises a crystalline metal. In this embodiment, the silver film is formed on the crystalline metal. The film formation on the crystalline metal causes the generated hydrogen gas to easily diffuse due to the fine unevenness on the surface of the crystalline metal, and consequently, the hydrogen gas is easily emitted from between the separator and the substrate surface.

The material of the substrate includes gold, copper, aluminum, nickel, manganese, cobalt, zinc, an alloy of them, or the like. The substrate may be formed of only a crystalline metal, or may comprise another metal, such as an amorphous metal. The substrate can have a configuration, for example, in which a crystalline metal film is formed on an amorphous metal film. The crystalline metal film and/or the amorphous metal film may be formed by a single layer, or may be formed by a plurality of layers. The substrate may be disposed on a substrate body, such as a resin, a silicon plate, or ceramics. The crystalline metal film can be formed with, for example, a solid electrolyte deposition using the solid electrolyte membrane. An exemplary usable film formation device includes one having the configuration that uses the solid electrolyte membrane as the separator in the film formation device 1A illustrated in FIG. 1A and FIG. 1B.

The crystalline metal on which the silver film is formed is a nickel film in some embodiments, and is a columnar crystal nickel film in some embodiments. In one embodiment, the substrate comprises the columnar crystal nickel film, and the silver film is formed on the columnar crystal nickel in some embodiments. For example, the substrate may be formed by a single layer of the columnar crystal nickel film, or may have a configuration in which a columnar crystal nickel film is formed on a metal film other than the columnar crystal nickel. Forming the silver film on the columnar crystal nickel allows easily eliminating air involved in bringing the separator and the substrate in contact and hydrogen generated in the electrodeposition process from the interface between the separator and the substrate, and consequently, a more uniform silver film can be formed. While not specifically limited, a film thickness of the columnar crystal nickel film is, for example, 0.1 to 50 and is 3 to 45 μm in some embodiments.

The columnar crystal nickel is a nickel with a columnar crystal structure, and the columnar crystal is an aggregate of dendrite-shaped (or cell-shaped) crystals having the same growth orientation. In this description, it is an aggregate of crystals having columnar structures approximately perpendicular to the surface of the substrate. Those skilled in the art can appropriately select the material, the condition, and the like to form the columnar crystal nickel film. As a nickel-containing solution used for forming the columnar crystal nickel film, a nickel chloride-nickel acetate plating bath is used in some embodiments. The columnar crystal nickel film can be formed with, for example, a solid electrolyte deposition using the solid electrolyte membrane. An exemplary usable film formation device includes one having the configuration that uses the solid electrolyte membrane as the separator in the film formation device 1A illustrated in FIG. 1A and FIG. 1B. As the nickel-containing solution, the nickel chloride-nickel acetate plating bath may be used. A current density in the formation process of the columnar crystal nickel film is, for example, 0.5 to 15 A/dm$^2$, and 5 to 10 A/dm$^2$ in some embodiments. In one embodiment, the columnar crystal nickel film is formed on a copper substrate. Forming the columnar crystal nickel film on the copper substrate allows suppressing copper ion dissolution from the copper substrate in forming the silver film. The material of the solid electrolyte membrane can include a fluorine-based resin, such as Nafion (registered trademark) manufactured by DuPont de Nemours, Inc., a hydrocarbon resin, a polyamic acid resin, a resin having ion exchangeable function, such as Selemion (CMV, CMD, and CMF series) manufactured by AGC Inc., and the like. A thickness of the solid electrolyte membrane is for example, 50 to 400 or 100 to 200 μm.

The anode may be a soluble anode, or may be an insoluble anode. The soluble anode can include a silver plate, a silver ball, a silver madreporite, a silver mesh, or the like. The insoluble anode can include, for example, a porosity metal body formed of a material having a small oxygen overvoltage, such as platinum or iridium oxide, one in which a porosity metal body having a high corrosion resistance, such as titanium, is coated with platinum, ruthenium oxide, iridium oxide, or the like.

According to the embodiment described above, the silver film can be uniformly formed by the solid electrolyte deposition.

EXAMPLES

While the following specifically describes the present disclosure with examples and comparative examples, the embodiment is not limited thereto.

Example 1

In the example 1, a silver film was formed as a separator on a nickel film (columnar crystal nickel) formed on a copper sputtered substrate by a solid electrolyte deposition using a polyethylene resin porous membrane. As a film formation device, one having the configuration illustrated in FIG. 1A was used.

<Substrate>

As a substrate, the nickel film formed on the copper sputtered substrate (nickel film/copper sputtered substrate) was prepared by the following process.

First, a polyimide tape (Kapton adhesive tape: 650R#25, manufactured by Teraoka Seisakusho co., Ltd.) provided with an opening of 10×20 mm was disposed on the copper sputtered substrate, thus defining a nickel film formation area. Subsequently, by a solid electrolyte deposition using a solid electrolyte membrane (product name: Nafion, manufactured by DuPont de Nemours, Inc.), a nickel film (targeted film thickness: 5 μm) was formed on the copper sputtered substrate. As the film formation device, one having the configuration in which a solid electrolyte membrane was used as a separator in the film formation device 1A illustrated in FIG. 1A and FIG. 1B was used. Other nickel film formation conditions are as follows.

Nickel plating bath: 1M nickel chloride-nickel acetate bath (pH 4.0)
Anode: Foamed nickel (NI-318201, manufactured by Nilaco Corporation)
Press: 1.0 kN
Temperature: 60° C.
Current Value: 150 mA
Film formation time (Application time): 200 seconds The obtained nickel film was a crystalline nickel (specifically, columnar crystal nickel).

<Porous Membrane without Ion Exchange Functional Group>

As the separator, a polyethylene resin porous membrane without ion exchange functional group was prepared. As the polyethylene resin porous membrane, a commercially available lithium-ion battery separator (product name: SETELA, manufactured by Toray Industries, Inc., average film thickness: 12 μm) was used. A ratio of the number of atoms between oxygen and carbon of the porous membrane measured by an X-ray electron spectroscopic measurement device (PHI-5800 manufactured by ULVAC-PHI) was 0.01 to 0.02, and it was confirmed that the porous membrane did not have the ion exchange functional groups.

<Electrolytic Solution Containing Silver Ions>

As the electrolytic solution, a silver methanesulfonate-potassium iodide bath having the following composition was prepared.

Composition of Silver Methanesulfonate-Potassium Iodide Bath (pH 7)
- Silver methanesulfonate 200 g/L
- Potassium iodide 500 g/L
- HBPSA 25 g/L
- Water was used as the solvent.
- pH was adjusted to 7.0 with a potassium hydroxide solution.

<Silver Film Formation>

First, a degreasing treatment, a water cleaning treatment, a pickling treatment (immersion in a 10% sulfuric acid water solution at room temperature for 30 seconds), and a water cleaning treatment were performed to the nickel film formed on the copper sputtered substrate in this order. An oxide film present in the nickel film surface is removed by the sulfuric acid water solution.

Subsequently, a silver film (targeted film thickness: 2 μm) was formed using the above-described film formation device illustrated in FIG. 1A and FIG. 1B. While the used substrate, porous membrane, electrolytic solution were as described above, other conditions were set as follows.

Anode: silver plate (AG-403518, manufactured by Nilaco Corporation)
Temperature: 40° C.
Press: 1.0 kN
Film formation time (Application time): 376 seconds
Current value 10 mA The current value 10 mA corresponds to the current density 5 mA/cm$^2$.

Specifically, as illustrated in FIG. 1B, the polyethylene resin porous membrane was pressed against the substrate with the pressure of 1.0 MPa by the pressing portion of the film formation device. Subsequently, the voltage was applied between the anode and the substrate (for 376 seconds) by the power supply unit 16 so as to have the current value of 10 mA while keeping the substrate temperature constant at 40° C. by a temperature controller, thus forming the silver film (targeted film thickness: about 2 μm). Accordingly, silver was deposited on the substrate, and the silver film was formed. As an after-treatment, the substrate was immersed in a 15% potassium pyrophosphate ($K_4P_2O_7$) solution at room temperature for 30 seconds, and subsequently, the water cleaning treatment and a drying treatment were performed. A silver film E1 was obtained through the above-described process.

<Evaluation>

[Appearance]

For the obtained silver film E1, the appearance was observed with a microscope (VH-8000, KEYENCE COR-PORATION). As a result, it was confirmed that a uniform silver film without non-film formation portion was formed.

[Current Efficiency]

For the obtained silver film E1, the weight of the silver film deposited on the substrate was measured. A ratio between this measurement value and a theoretical precipitation amount calculated from the Faraday's law was obtained, thereby calculating the current efficiency of the silver film. The current efficiency was 100%.

Example 2

A silver film E2 was formed by the method similar to that of the example 1 excluding that the current value was set to 20 mA and the film formation time was set to 188 seconds in the silver film formation. The appearance and the current efficiency were evaluated by the method similar to that of the example 1. The current value 20 mA corresponds to the current density 10 mA/cm$^2$.

It was confirmed that a uniform silver film without non-film formation portion was formed in the example 2. The current efficiency was 100%.

Example 3

A silver film E3 was formed by the method similar to that of the example 1 excluding that the current value was set to 30 mA and the film formation time was set to 126 seconds in the silver film formation. The appearance and the current efficiency were evaluated by the method similar to that of the example 1. The current value 30 mA corresponds to the current density 15 mA/cm$^2$.

It was confirmed that a uniform silver film without non-film formation portion was formed in the example 3. The current efficiency was 98%.

Comparative Example 1

A silver film C1 was formed by the method similar to that of the example 1 excluding that a solid electrolyte membrane (product name: Nafion, manufactured by DuPont de Nemours, Inc.) was used instead of the polyethylene resin porous membrane as the separator in the silver film formation. The appearance and the current efficiency were evaluated by the method similar to that of the example 1.

In the comparative example 1, the silver film C1 included a non-film formation portion and was not uniformly formed. The current efficiency was 4%.

Comparative Example 2

A silver film C2 was formed by the method similar to that of the example 1 excluding that a silver nitrate bath below was used as the electrolytic solution. The appearance and the current efficiency were evaluated by the method similar to that of the example 1.

Composition of silver nitrate bath (pH=9)
- Silver nitrate 40 g/L
- Sodium pyrophosphate 20 g/L
- Ammonium sulphate 120 g/L
- 25% Ammonia solution 40 mL/L
- Water was used as the solvent.
- pH was adjusted to 9.0 with an ammonia solution.

In the comparative example 2, the silver film C2 included a non-film formation portion and was not uniformly formed. The current efficiency was 7%.

Comparative Example 3

A silver film C3 was formed by the method similar to that of the example 1 excluding that an amorphous nickel film containing a nickel-phosphorus alloy was formed on the copper sputtered substrate and a silver film was formed on the amorphous nickel film. The appearance and the current efficiency were evaluated by the method similar to that of the example 1. The amorphous nickel film was formed by an electroless plating method using an electroless nickel bath containing phosphinate as a reductant.

In the comparative example 3, the silver film C3 included a non-film formation portion and was not uniformly formed. The current efficiency was 13%.

Discussion

As described above, while the uniform silver film was obtained in the examples 1 to 3, the non-film formation portion was generated and the uniform silver film was not obtained in the comparative examples 1 to 3.

Specifically, in the comparative example 1, a silver dendrite was generated in the solid electrolyte membrane. It is considered that the silver dendrite interfered with the movement of silver ions, thus generating the non-film formation portion. Meanwhile, the polyethylene resin porous membrane used in the examples does not have the ion exchange functional groups by which the silver ions are trapped. Therefore, it is considered that the silver ions were efficiently transported from the anode to the cathode, thus allowing forming the uniform silver film.

In the comparative example 2, while the silver film was formed using the silver nitrate bath, air bubbles of the hydrogen gas interfered with the silver film formation, thus generating the non-film formation portion. Meanwhile, in the examples 1 to 3 using the silver methanesulfonate-potassium iodide bath, the silver film was able to be uniformly formed. Organic sulfonic acid ions, such as methanesulfonic acid ions, are ligands having a large stability constant with the silver ions, and present close to the silver ions in the electrolytic solution. Therefore, it is considered that, in the examples 1 to 3, the decomposition reaction of water was able to be suppressed, and thus resulted in allowing suppressing the generation of the hydrogen gas.

In the comparative example 3, while the silver film was formed on the amorphous nickel film, air bubbles of the hydrogen gas interfered with the silver film formation, thus generating the non-film formation portion. This is considered because the surface of the amorphous nickel film is flatter than the surface of the crystalline nickel film, and the generated hydrogen gas was trapped between the amorphous nickel film and the separator. Meanwhile, the crystalline nickel film used in the examples has the fine unevenness on the surface, and the presence of the unevenness causes the generated hydrogen gas to easily move. Therefore, it is considered that, in the examples 1 to 3, it is difficult for the hydrogen gas to remain as the air bubbles between the nickel film and the separator, thus allowing suppressing the generation of the non-film formation portion due to the air bubbles.

Examples 4 to 11

Silver films were formed by the method similar to that of the example 1 excluding that silver methanesulfonate-potassium iodide baths having compositions below were used as the electrolytic solutions and the current density was set to 5 mA/cm$^2$, 10 mA/cm$^2$, or 15 mA/cm$^2$. The appearance and the current efficiency were evaluated by the method similar to that of the example 1. Table 1 indicates the results.

TABLE 1

|  | Silver Methanesulfonate Content (g/L) | Potassium Iodide Content (g/L) | HBPSA Content (g/L) | Appearance | Current Efficiency at 5 mA/cm$^2$ (%) | Current Efficiency at 10 mA/cm$^2$ (%) | Current Efficiency at 15 mA/cm$^2$ (%) |
|---|---|---|---|---|---|---|---|
| Example 4 | 134 | 500 | 25 | Uniform | 90 | 68 | 44 |
| Example 5 | 168 | 500 | 25 | Uniform | 100 | 86 | 62 |
| Example 6 | 200 | 500 | 25 | Uniform | 100 | 95 | 71 |
| Example 7 | 268 | 500 | 25 | Uniform | 100 | 100 | 91 |
| Example 8 | 200 | 400 | 25 | Uniform | 100 | 90 | 53 |
| Example 9 | 200 | 600 | 25 | Uniform | 100 | 98 | 73 |
| Example 10 | 200 | 500 | 20 | Uniform | 100 | 94 | 71 |
| Example 11 | 200 | 500 | 40 | Uniform | 100 | 86 | 51 |

Discussion

It was confirmed that the current efficiency varies depending on the current value and the bath composition in the solid electrolyte deposition using the silver methanesulfonate-potassium iodide bath. A film forming rate has a positive correlation with the current density. As the film forming rate increases, the number of film formations per unit time increases. Accordingly, when the uniform film formation with high current density is allowed, the production cost can be reduced. Here, with reference to Japanese Industrial Standard H 8618 (industrial silver plating), an evaluation "uniform" was given to a case where a non-film formation portion having a diameter of 10 μm or more was not present on the silver film, and Ra was in a range of 0.1 to 0.6 μm and Rz was in a range of 1.0 to 5.0 μm for the surface roughness of the silver film.

Upper limit values and/or lower limit values of respective numerical ranges described in this description can be appropriately combined to specify an intended range. For example, upper limit values and lower limit values of the numerical ranges can be appropriately combined to specify an intended range, upper limit values of the numerical ranges can be appropriately combined to specify an intended range, and lower limit values of the numerical ranges can be appropriately combined to specify an intended range.

It should be understood that throughout the entire description, the expression as a singular form also includes a concept of its plural form unless otherwise stated. Accordingly, articles of a singular form (for example, in the case of English, "a," "an," and "the") should be understood as including the concept of its plural form unless otherwise stated.

While the embodiment has been described in detail, the specific configuration is not limited to the embodiment. Design changes within a scope not departing from the gist of the disclosure are included in the disclosure.

What is claimed is:

1. A method for forming a silver film, comprising:
    disposing an anode, a substrate as a cathode, and a separator such that the separator is positioned between the anode and the substrate and the separator is in contact with a surface of the substrate, the separator including an electrolytic solution that contains silver ions; and
    applying a voltage between the anode and the substrate to form a silver film on the substrate,
    wherein the separator is a porous membrane without ion exchange functional group,
    wherein the electrolytic solution contains organic sulfonic acid ions, and
    wherein the substrate comprises a crystalline metal, and the silver film is formed on the crystalline metal.
2. The method according to claim 1,
    wherein the electrolytic solution contains silver organic sulfonate.
3. The method according to claim 2,
    wherein the silver organic sulfonate is silver alkanesulfonate.
4. The method according to claim 3,
    wherein the silver alkanesulfonate is silver methanesulfonate.
5. The method according to claim 1,
    wherein the electrolytic solution is a silver methanesulfonate-potassium iodide bath.
6. The method according to claim 5,
    wherein the electrolytic solution further contains N-(3-hydroxy-1-butylidene)-p-sulfanilic acid (HBPSA).
7. The method according to claim 1,
    wherein the porous membrane is a polyolefin resin porous membrane.
8. The method according to claim 7,
    wherein the polyolefin resin porous membrane is a polyethylene resin porous membrane.
9. The method according to claim 1,
    wherein the crystalline metal is a nickel film.
10. The method according to claim 9,
    wherein the nickel film has a columnar crystal form.

* * * * *